United States Patent
Christensen et al.

(10) Patent No.: US 10,170,755 B2
(45) Date of Patent: Jan. 1, 2019

(54) LITHIUM SULFUR CELL AND PREPARATION METHOD

(71) Applicant: Robert Bosch GmbH, Stuttgart (DE)

(72) Inventors: John F. Christensen, Mountain View, CA (US); Paul Albertus, Washington, DC (US); Timm Lohmann, Mountain View, CA (US); Boris Kozinsky, Waban, MA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 1034 days.

(21) Appl. No.: 14/459,775

(22) Filed: Aug. 14, 2014

(65) Prior Publication Data
US 2015/0325849 A1 Nov. 12, 2015

Related U.S. Application Data (60) Provisional application No. 61/866,089, filed on Aug. 15, 2013, provisional application No. 61/866,080, filed on Aug. 15, 2013.

(51) Int. Cl.
*H01M 4/36* (2006.01)
*H01M 10/052* (2010.01)
(Continued)

(52) U.S. Cl.
CPC ............ *H01M 4/366* (2013.01); *H01M 4/136* (2013.01); *H01M 4/1397* (2013.01); *H01M 4/382* (2013.01); *H01M 4/5815* (2013.01); *H01M 4/62* (2013.01); *H01M 4/625* (2013.01); *H01M 10/052* (2013.01); *H01M 2004/021* (2013.01); *H01M 2004/028* (2013.01);
(Continued)

(58) Field of Classification Search
CPC ........... H01M 1/052; H01M 2004/021; H01M 2004/028; H01M 2220/20; H01M 4/136; H01M 4/1397; H01M 4/366; H01M 4/382; H01M 4/5815; H01M 4/62; H01M 4/625
See application file for complete search history.

(56) References Cited

U.S. PATENT DOCUMENTS

| | | |
|---|---|---|
| 2002/0055040 A1 | 5/2002 | Mukherjee et al. |
| 2004/0091776 A1 | 5/2004 | Hwang |

(Continued)

FOREIGN PATENT DOCUMENTS

| | | |
|---|---|---|
| CN | 1499659 A | 5/2004 |
| KR | 10-2002-0018397 A | 3/2002 |
| KR | 10-2012-0051549 A | 5/2012 |

OTHER PUBLICATIONS

Supplementary European Search Report corresponding to European Patent Application No. 14 83 6516 (8 pages).

(Continued)

*Primary Examiner* — Barbara L Gilliam
*Assistant Examiner* — Adam A Arciero
(74) *Attorney, Agent, or Firm* — Maginot Moore & Beck LLP (57) ABSTRACT

An electrochemical cell in one embodiment includes a first negative electrode including a form of lithium, a positive electrode, and a first separator positioned between the first negative electrode and the positive electrode, wherein the positive electrode includes a plurality of coated small grains of $Li_2S$.

20 Claims, 4 Drawing Sheets

(51) Int. Cl.
    H01M 4/1397    (2010.01)
    H01M 4/58      (2010.01)
    H01M 4/62      (2006.01)
    H01M 4/136     (2010.01)
    H01M 4/38      (2006.01)
    H01M 4/02      (2006.01)
(52) U.S. Cl.
    CPC ........ *H01M 2220/20* (2013.01); *Y02E 60/122*
            (2013.01); *Y02T 10/7011* (2013.01); *Y10T*
                                    *29/49117* (2015.01)

(56) References Cited

U.S. PATENT DOCUMENTS

| 2012/0094189 A1 | 4/2012 | Scrosati et al. |
| 2013/0065128 A1 | 3/2013 | Li et al. |
| 2013/0295469 A1* | 11/2013 | Liang .................... H01M 4/134 429/335 |

OTHER PUBLICATIONS

Seh, Zhi Wei et al., "Sulphur-TiO2 yolk-shell nanoarchitecture with internal void space for long-cycle lithium-sulphur batteries", Nature Communications, vol. 4, Jan. 8, 2013 (6 pages).

International Search Report and Written Opinion corresponding to PCT Application No. PCT/US2014/051089, dated Nov. 21, 2014 (11 pages).

Cai, Kunpeng et al., "Nanostructured Li2S—C Composites as Cathode Material for High-Energy Lithium/Sulfur Batteries", Nano Letters, 2012, vol. 12, No. 12, pp. 6474-6479 (6 pages).

Guo, Juchen et al., "Lithium-Sulfur Battery Cathode Enabled by Lithium-Nitrile Interaction", Journal of the American Chemical Society, Epub: Dec. 12, 2012, vol. 135, No. 2, pp. 763-767 (5 pages).

Amatucci, G.G. et al., "Fluoride based electrode materials for advanced energy storage devices", Journal of Fluorine Chemistry, 2007. 128(4): p. 243-262.

J. Cabana et al., "Beyond Intercalation-Based Li-Ion Batteries: The State of the Art and Challenges of Electrode Materials Reacting Through Conversion Reactions", Advanced Materials, 2010. 22(35): p. E170-E192.

USABC Goals for Advanced Batteries for EVs. 2002, United States Advanced Battery Consortium. http://www.uscar.org/commands/files_download.php?files_id=27.

English Translation of First Chinese Office Action corresponding to Chinese Patent Application No. 201480056609.9 (9 pages).

Notice of Preliminary Rejection (English translation) from corresponding KR patent application No. 10-2016-7006715 dated Jul. 19, 2018 (6 pages).

* cited by examiner

LITHIUM SULFUR CELL AND PREPARATION METHOD

CROSS REFERENCE

This application claims the benefit of U.S. Provisional Application No. 61/866,089 filed Aug. 15, 2013, and U.S. Provisional Application No. 61/866,080 filed Aug. 15, 2013, the entire contents of which are both herein incorporated by reference.

FIELD OF THE DISCLOSURE

The present disclosure relates to batteries and more particularly to lithium-metal batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

Batteries with a lithium metal negative electrode afford exceptionally high specific energy (in Wh/kg) and energy density (in Wh/L) compared to batteries with conventional carbonaceous negative electrodes. However, the cycle life of such systems is rather limited due to (a) significant volume changes in the cell sandwich during every cycle as the Li metal is stripped and plated, (b) formation of dendrites during recharge that may penetrate the separator and short the cell and/or result in fragmentation and capacity loss of the negative electrode; (c) morphology changes in the metal upon extended cycling that result in a large overall volume change in the cell; and (d) changes in the structure and composition of the passivating layer that forms at the surface of the metal when exposed to certain electrolytes, which may isolate some metal and/or increase the resistance of the cell over time.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity for which some practical cycling has been achieved for a lithium-ion positive electrode is 1168 mAh/g (based on the mass of the lithiated material), which is shared by $Li_2S$ and $Li_2O_2$. Other high-capacity materials include $BiF_3$ (303 mAh/g, lithiated), $FeF_3$ (712 mAh/g, lithiated), $LiOH.H_2O$ (639 mAh/g), and others. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

Figure 1:
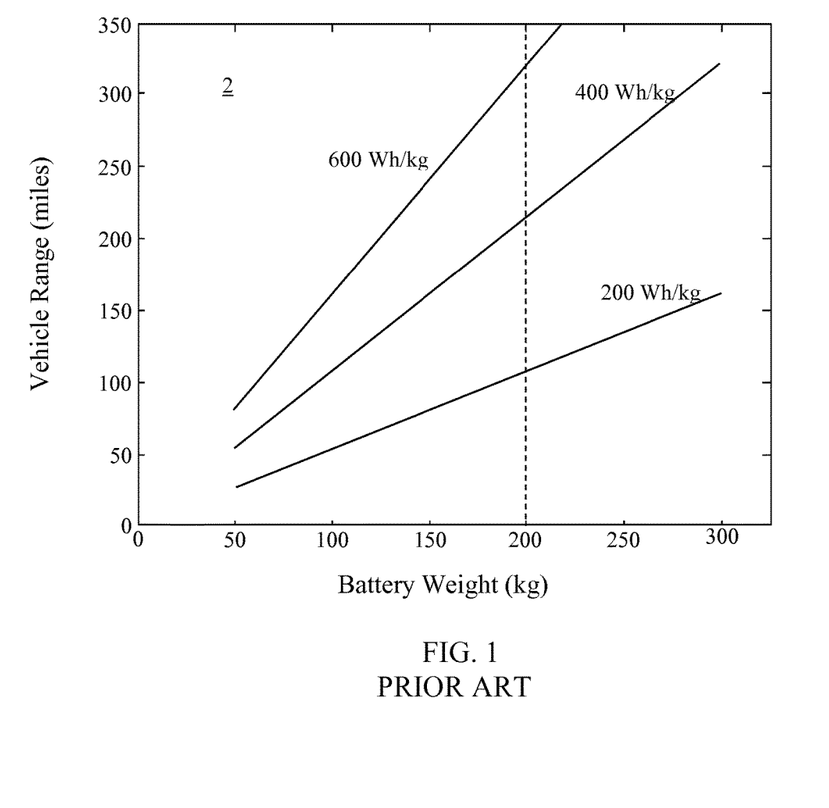
FIG. 1 depicts a plot showing the relationship between battery weight and vehicular range for various specific energies.

FIG. 1 depicts a chart 2 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Lithium-based batteries have a sufficiently high specific energy (Wh/kg) and energy density (Wh/L) that they are now being used in electric-powered vehicles. However, in order to power a full-electric vehicle with a range of several hundred miles, a battery with a higher specific energy than the present state of the art (an intercalation system with a graphite anode and transition-metal oxide cathode) is necessary.

Figure 2:
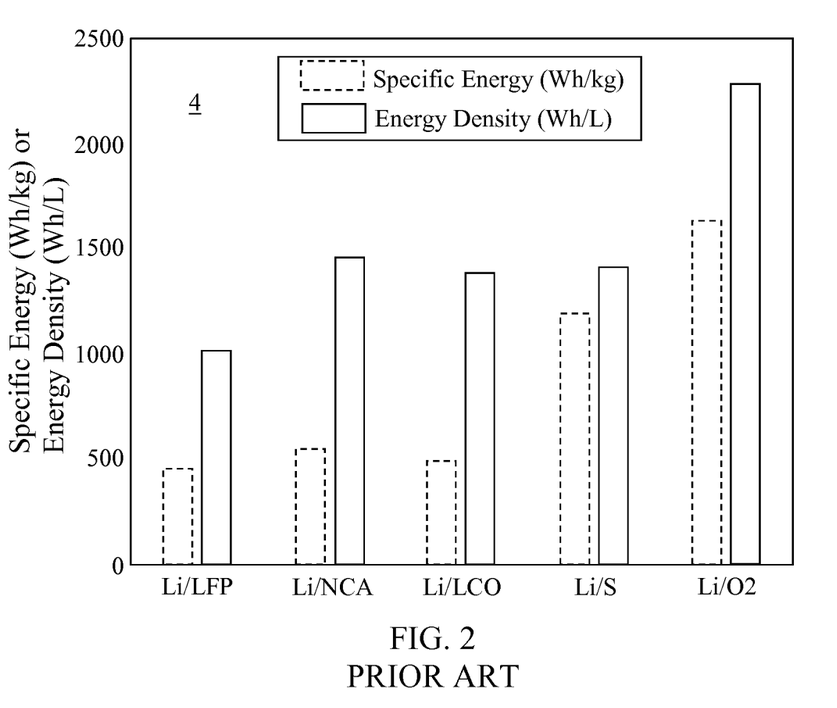
FIG. 2 depicts a chart of the specific energy and energy density of various lithium-based cells.

Some options which provide higher specific energy as compared to the currently utilized batteries are possible. For example, FIG. 2 depicts a chart 4 which identifies the specific energy and energy density of various lithium-based chemistries. In the chart 4, only the weight of the active materials, current collectors, binders, separator, and other inert material of the battery cells are included. The packaging weight, such as tabs, the cell can, etc., are not included. As is evident from the chart 4, the lithium-sulfur battery, which uses a lithium metal negative electrode and a positive electrode that reduces sulfur to form lithium sulfide, has a significantly higher specific energy than the present state of the art.

There are significant challenges that must be addressed for the lithium-sulfur system to become commercially viable. Important challenges include increasing the cycle life (current state of the art is 100 to several hundred cycles; target is >500, preferably >2000), increasing the utilization of sulfur (typical utilization is below 75% due to passivation of the positive electrode by $Li_2S$ or $Li_2S_2$, which are electronically insulating), increasing the mass fraction of sulfur in the positive electrode (typically the mass fraction is below 50%), and increasing the rate capability of the cell (target discharge rate is 1 C or higher). While some Li/S cells described in the literature fulfill some of the objectives for cycle life, specific energy, and specific power, none of these cells adequately address all of the issues as would be needed to realize a commercial cell.

What is needed therefore is a lithium-sulfur electrochemical cell which addresses one or more of the above identified issues.

SUMMARY

An electrochemical cell in one embodiment includes a first negative electrode including a form of lithium, a positive electrode, and a first separator positioned between the first negative electrode and the positive electrode, wherein the positive electrode includes a plurality of coated small grains of $Li_2S$.

In one or more embodiments the coating of each of the plurality of coated small grains of $Li_2S$ comprises no more than 20% of the mass of each of the plurality of coated small grains of $Li_2S$.

In one or more embodiments an electrochemical cell includes a liquid electrolyte within pores in the positive electrode.

In one or more embodiments an electrochemical cell includes a second negative electrode including a form of lithium, and a second separator positioned between the second negative electrode and the positive electrode.

In one or more embodiments each of the grains in the plurality of coated small grains of $Li_2S$ has a diameter of about 100 nm to 10 µm.

In one or more embodiments each of the grains in the plurality of coated small grains of $Li_2S$ has a diameter of 1 µm.

In one or more embodiments each of the grains in the plurality of coated small grains of $Li_2S$ is coated with carbon.

In one or more embodiments each of the grains in the plurality of coated small grains of $Li_2S$ is coated with $Al_2O_3$.

A method of forming an electrochemical cell in one embodiment includes forming a plurality of small $Li_2S$ grains, coating the plurality of small $Li_2S$ grains, forming a positive electrode using the coated plurality of small $Li_2S$ grains, and locating a separator between the positive electrode and a negative electrode including a form of lithium.

In one or more embodiments, a method of forming an electrochemical cell includes exposing the coated plurality of small $Li_2S$ grains and an uncoated plurality of small $Li_2S$ grains to an organic solvent including dissolved sulfur, dissolving the uncoated plurality of small $Li_2S$ grains with the organic solvent, and rinsing the coated plurality of small $Li_2S$ grains after exposing the coated plurality of small $Li_2S$ grains to the organic solvent and prior to forming the positive electrode.

In one or more embodiments dissolving the uncoated plurality of small $Li_2S$ grains includes dissolving a first portion of the uncoated plurality of small $Li_2S$ grains, rinsing a second portion of the uncoated plurality of small $Li_2S$ grains after dissolving the first portion, and dissolving the second portion of the uncoated plurality of small $Li_2S$ grains.

In one or more embodiments dissolving the uncoated plurality of small $Li_2S$ grains includes dissolving the uncoated plurality of small $Li_2S$ grains into a lithium polysulfide.

In one or more embodiments, a method of forming an electrochemical cell includes forming a plurality of coating fragments by dissolving the uncoated plurality of small $Li_2S$ grains, wherein forming the positive electrode includes forming the positive electrode using the coated plurality of small $Li_2S$ grains and the plurality of coating fragments.

In one or more embodiments, a method of forming an electrochemical cell includes forming a plurality of coating fragments by dissolving the uncoated plurality of small $Li_2S$ grains, and separating the plurality of coating fragments and the coated plurality of small $Li_2S$ grains, wherein forming the positive electrode includes forming the positive electrode using the separated coated plurality of small $Li_2S$ grains.

In one or more embodiments, separating the plurality of coating fragments includes separating the plurality of coating fragments using a sedimentation process.

In one or more embodiments, separating the plurality of coating fragments includes separating the plurality of coating fragments using a centrifugation process.

In one or more embodiments, a method of forming an electrochemical cell includes exposing the coated plurality of small $Li_2S$ grains and an uncoated plurality of small $Li_2S$ grains to toluene, dissolving the uncoated plurality of small $Li_2S$ grains with the toluene, and rinsing the coated plurality of small $Li_2S$ grains after exposing the coated plurality of small $Li_2S$ grains to the toluene and prior to forming the positive electrode.

In one or more embodiments, a method of forming an electrochemical cell includes forming a plurality of coating fragments by dissolving the uncoated plurality of small $Li_2S$ grains, wherein forming the positive electrode includes forming the positive electrode using the coated plurality of small $Li_2S$ grains and the plurality of coating fragments.

In one or more embodiments, a method of forming an electrochemical cell includes forming a plurality of coating fragments by dissolving the uncoated plurality of small $Li_2S$ grains, and separating the plurality of coating fragments and the coated plurality of small $Li_2S$ grains, wherein forming the positive electrode includes forming the positive electrode using the separated coated plurality of small $Li_2S$ grains.

In one or more embodiments, separating the plurality of coating fragments includes separating the plurality of coating fragments using a sedimentation process.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 3:
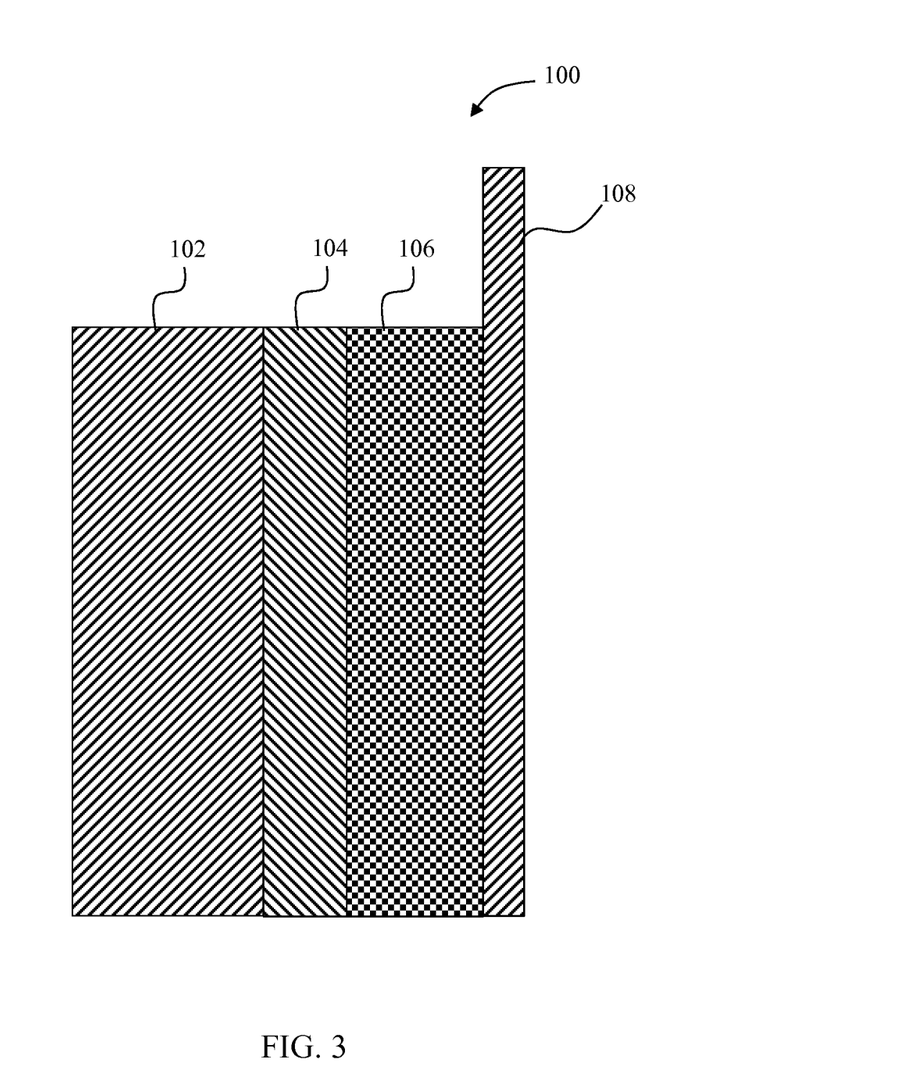
FIG. 3 depicts a simplified schematic of a solid state electrochemical cell including a positive electrode with nano-sized $Li_2S$ particles with a conductive coating.

FIG. 3 depicts a solid state lithium-sulfur cell 100 with improved cycle life and energy density. The cell 100 includes a negative electrode 102, a separator 104, and a positive electrode 106. The negative electrode 102 contains Li metal or some other Li-insertion material that can reversibly insert and extract Li ions electrochemically. The negative electrode 102 in some embodiments includes a current collector (not shown), such as copper metal. In the embodiment of FIG. 3, the negative electrode 102 uses Li metal to conduct electrons to and from the electrode.

The separator 104 is electronically insulating, and in some embodiments includes a Li-conducting solid electrolyte with one or more components, that may include LiPON, Li-conducting garnet, Li-conducting sulfide (e.g., $Li_2S$—$P_2S_5$), Li-conducting polymer (e.g., polyethylene oxide), Li-conducting metal-organic frameworks (e.g., as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference), $Li_3N$, $Li_3P$, thio-LISiCONs, Li-conducting NaSICONs, $Li_{10}GeP_2S_{12}$, lithium polysulfidophosphates, or other solid Li-conducting material.

The positive electrode 106 contains a coated form of sulfur and/or lithium sulfide ($Li_2S$). In some embodiments, the positive electrode 106 includes additional Li-insertion materials, an electronically conducting material (e.g., carbon fragments, graphite, and/or carbon black), and a solid-electrolyte Li-conducting phase (including those materials that could be used for the separator). The positive electrode 106 is connected to an electronically-conductive current collector 108 (e.g., Al metal).

The cell 100 described above (also referred to as a "cell sandwich") is double sided in some embodiments. In other words, the cell 100 is symmetric about the Al current collector as follows: negative electrode/separator/positive electrode/positive current collector/positive electrode/separator/negative electrode/(negative current collector) and stacked (as a "stack") or wound (as a "jellyroll") so as to increase the capacity per unit volume. In some embodiments, the cell 100 is stacked in a bipolar design (negative electrode/separator/positive electrode/positive current collector/bipolar plate/negative electrode . . . ) so as to increase the cell voltage. This electrochemically active volume is enclosed in a cell housing (not shown), the terminals of which are wired to the negative and positive poles of the stack or jellyroll.

The $Li_2S$ in the positive electrode 106 may be obtained using commercially available $Li_2S$ that is milled into small grains (about 100 nm to 10 um diameter), or it may be obtained from synthesized nano-$Li_2S$ (<1 μm diameter). The $Li_2S$ in the positive electrode 106 is coated with a material that prevents it from reacting with the electrolyte, even after Li is extracted electrochemically from the $Li_2S$. The coating material is preferably a mixed electronic and Li+ conductor, such as carbon or $Ti_2S$, but it may also be an insulator such as $Al_2O_3$.

The coating is preferably very thin such that it comprises no more than 20% of the mass of the coated $Li_2S$. The $Li_2S$ particles may be any shape, but are preferably spherical. The coating may be accomplished via a chemical vapor deposition (CVD), atomic layer deposition (ALD), physical vapor deposition (PVD) or other coating process. When carbon is the coating, it is preferably deposited on the surface of the $Li_2S$ particles by a CVD method developed by Prof. Elton Cairns of the University of California, Berkeley (UC Berkeley Case no. B14-011) using gaseous $C_2H_2$ as a precursor. The CVD is carried out at approximately 400° C. under slowly-flowing Ar. The coating procedure may be carried out several times in order to ensure complete coverage of the particles.

In one embodiment, the nano-$Li_2S$ is synthesized using a method developed by Prof. Elton Cairns of the University of California, Berkeley (UC Berkeley Case no. B14-011). In this method, a solution-based reaction of elemental sulfur with 1M $Li(CH_2CH_3)_3BH$ solution in THF is used. Following the preparation of nano-$Li_2S$, the carbon coating is deposited on the surface of the particles using CVD. The nano-$Li_2S$ is fully covered by a thin layer of carbon, which enhances conductivity and prevents a polysulfide shuttle process. The gaseous precursor for carbon is $C_2H_2$. The temperature used for CVD is 400° C., and the atmosphere is slowly-flowing Ar. The coating procedure can be repeated 3-4 times to achieve full coverage of carbon on the $Li_2S$ particles.

Sometimes the above described methods for synthesizing coated nano-$Li_2S$ result in a mixture of completely coated (i.e., pinhole-free) $Li_2S$ and some uncoated and/or partially coated $Li_2S$. The presence of the latter components (jointly referred to herein as "uncoated" $Li_2S$ particles) would limit the cycle life of the Li/S cell 100. Specifically, the uncoated $Li_2S$ is available to react with the electrolyte or dissolve into the electrolyte. Subsequently, this dissolved sulfide may form a dissolved lithium polysulfide ($Li_2S_x$, $1<x\le8$) that reacts with the negative electrode, resulting in loss of active sulfur and therefore a reduction in the capacity of the cell. Hence, when one of the foregoing methods is used which results in both coated and uncoated $Li_2S$, the uncoated $Li_2S$ is separated from the well-coated $Li_2S$, and only the well-coated $Li_2S$ is used in fabricating the positive electrode 106 of the cell 100.

In one embodiment, the coated $Li_2S$ is obtained from a mixture of coated and uncoated $Li_2S$ by dissolving the uncoated $Li_2S$. Specifically, when uncoated $Li_2S$ is exposed to a solution containing an organic solvent (e.g., DOL) and dissolved sulfur, the sulfur reacts with the $Li_2S$ to form soluble lithium polysulfides. The introduction of the dissolved polysulfide species results in an intense change in color of the solution.

Accordingly, in one embodiment, a mixture of coated and uncoated $Li_2S$ is mixed with a sulfur solution. After allowing time for dissolution of any uncoated $Li_2S$, the remaining $Li_2S$ particles are collected from the solution and washed with organic solvent that does not contain sulfur. The washed $Li_2S$ particles are predominantly coated $Li_2S$ particles. Some uncoated $Li_2S$ particles, however, may still remain. Accordingly, the process is repeated several times until there is no color change observed upon mixing the $Li_2S$ particles with the sulfur solution, indicating that all of the imperfectly coated $Li_2S$ has been dissolved and removed.

The above described process may be modified so as to continuously flow a sulfur solution over a mixture of coated and uncoated $Li_2S$ particles until there is no color change observed. Moreover, rather than visually observing the color change of the solution, a chemical sensor may be used to determine when the solution no longer contains polysulfide species.

In some embodiments, the dissolved lithium polysulfide is electrochemically oxidized to form sulfur, which in turn can be recycled and used again in the $Li_2S$ purification process. A byproduct of this part of the process can include the plating of Li metal.

Once the uncoated $Li_2S$ particles have been dissolved, the remaining coated $Li_2S$ particles are rinsed in organic solvent that does not contain sulfur. Afterwards the coated $Li_2S$ particles are dried, possibly at elevated temperature (80 to 120° C. for up to 12 hours), in order to remove any residual solvent. The process results in a collection of well-coated $Li_2S$ and potentially some fragments of coating material that no longer contain $Li_2S$.

In one embodiment, the positive electrode 106 is fabricated directly from this collection of coated $Li_2S$ and coating material fragments. For example, in embodiments wherein the coating material is a mixed electronic and ionic conductor, the presence of the coating material fragments can enhance the power capability of the composite electrode.

In another embodiment, the fragments are separated from the coated $Li_2S$ in a second process. For example, by sedimentation in an inert liquid or by centrifugation. Both of these methods operate on the principle that the coated $Li_2S$ has a much higher density than the coating material fragments, many of which may be partially incomplete hollow spheres.

Further process steps for completing the manufacture of the positive electrode 106 preferably follow a standard method for fabricating battery electrodes. Thus, in some embodiments the coated $Li_2S$ is mixed with conductive additives, binder, and optionally solid electrolyte powders (e.g., lithium-conducting garnet or lithium-conducting sulfide glasses or ceramics) in a carrier solvent. The mixture forms a slurry that can be coated onto the positive current collector. The electrode is then heated so that the solvent evaporates. The electrode may then be densified using a roll press.

In another embodiment, toluene is used to dissolve the uncoated $Li_2S$ particles. The use of toluene to dissolve $Li_2S$ in $TiO_2$ particles is discussed by Seh et al., "Sulphur-$TiO_2$ yolk-shell nanoarchitecture with internal void space for long-cycle lithium-sulphur batteries," Nature Communications 4, Article number: 1331 doi:10.1038/ncomms2327, the entire contents of which are herein incorporated by reference. In the Seh article, the toluene is transported to the core through porous $TiO_2$ where the sulfur is dissolved. The present process simply introduces the toluene into the mixture of coated and uncoated $Li_2S$ where the uncoated $Li_2S$ is dissolved while the coated $Li_2S$ is not. The remaining coated $Li_2S$ particles are then rinsed in an inert organic solvent and dried, and the electrode fabrication procedure outlined in the embodiment above is subsequently followed.

Figure 4:
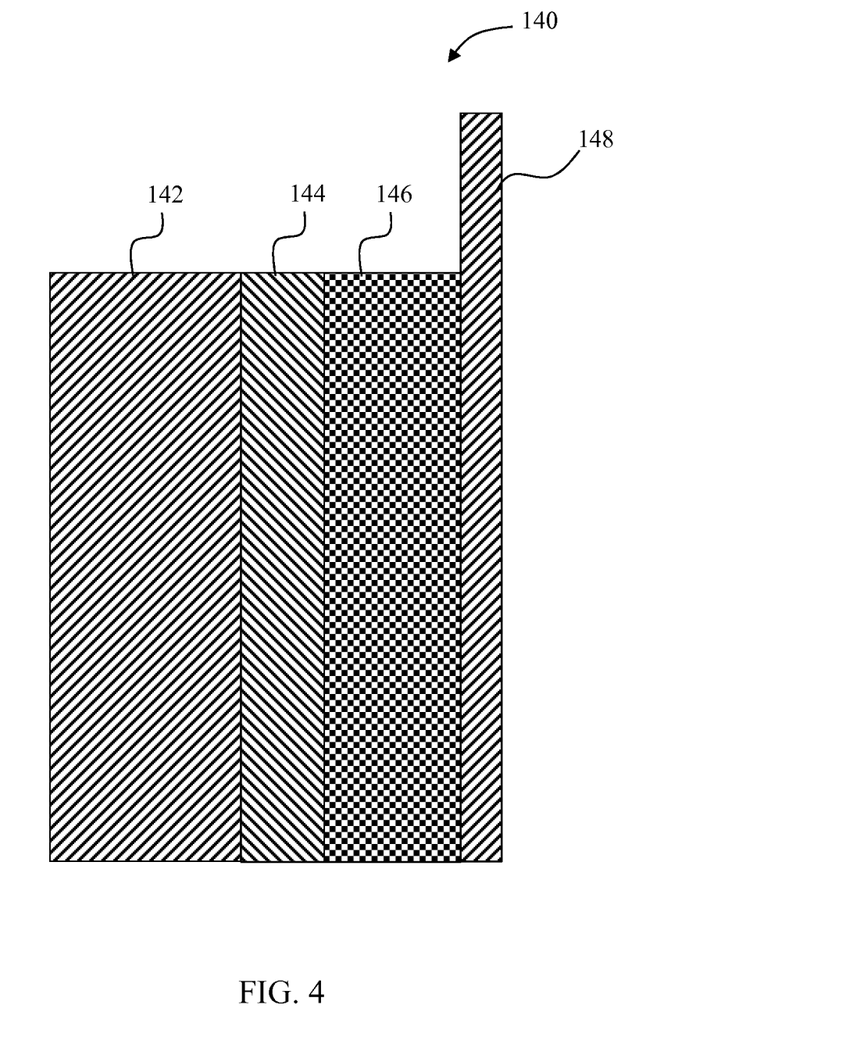
FIG. 4 depicts a simplified schematic of an electrochemical cell including a positive electrode with nano-sized $Li_2S$ particles with a conductive coating.

While the embodiment of FIG. 3 is a solid state embodiment, the disclosure is further applicable to embodiments including a liquid electrolyte. By way of example, FIG. 4 depicts a lithium-sulfur cell 140 with improved cycle life and energy density. The cell 140 includes a negative electrode 142, a separator 144, and a positive electrode 146. The negative electrode 142 contains Li metal or some other Li-insertion material that can reversibly insert and extract Li ions electrochemically. The negative electrode 142 in some embodiments includes a current collector (not shown), such as copper metal. In the embodiment of FIG. 4, the negative electrode 142 uses Li metal to conduct electrons to and from the electrode.

The separator 144 is electronically insulating, and in some embodiments includes a Li-conducting solid electrolyte and/or a porous material with Li-conducting liquid electrolyte in the pores.

The positive electrode 146 contains a coated form of sulfur and/or lithium sulfide ($Li_2S$). In some embodiments, the positive electrode 146 includes additional Li-insertion materials, an electronically conducting material (e.g., carbon fragments, graphite, and/or carbon black), and a Li-conducting phase (e.g., liquid electrolyte and/or solid electrolyte). The positive electrode 146 is connected to an electronically-conductive current collector 148 (e.g., Al metal).

The cell 140 is constructed of similar materials and in substantially the same manner as the cell 100. Thus, the $Li_2S$ in the positive electrode 146 is provided and coated in the same manner as described above with respect to the cell 100. Some modifications are implicated, however, since a liquid electrolyte is included in the cell 140. For example, the coating of the $Li_2S$ in the positive electrode 146 must be configured to prevent the $Li_2S$ from dissolving into the electrolyte even after Li is extracted electrochemically from the $Li_2S$. In some embodiments, the coating material may be the same as the solid state cell. The coating material may thus be a mixed electronic and Li+ conductor, such as carbon or $Ti_2S$, but it may also be an insulator such as $Al_2O_3$.

One other difference is that during densification described above with respect to cell 100, some pores are left in the electrode such that they can be filled with liquid electrolyte during cell fabrication of the cell 140.

The above described embodiments thus provide a lithium-sulfur cell with improved cycle life and energy density which in some embodiments is a solid state cell. The embodiments avoid reaction of $Li_2S$, S, and lithium polysulfides ($Li_2S_x$, $1<x<=8$) with the electrolyte. By providing a conductive coating and nanosized $Li_2S$ particles the rate capability of the cell is increased. The disclosed embodiments provide for increased sulfur loading and utilization of a cell while providing increased safety by avoiding the use of a volatile organic electrolyte. Additionally, the charging time of the cell is decreased while increasing the power delivered from the cell.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of forming an electrochemical cell, comprising:
    forming a plurality of $Li_2S$ grains;
    coating the plurality of $Li_2S$ grains;
    exposing the coated plurality of $Li_2S$ grains and an uncoated plurality of $Li_2S$ grains to an organic solvent including dissolved sulfur;
    dissolving the uncoated plurality of $Li_2S$ grains with the organic solvent;
    rinsing the coated plurality of $Li_2S$ grains after exposing the coated plurality of $Li_2S$ grains to the organic solvent;
    forming a positive electrode using the rinsed coated plurality of $Li_2S$ grains; and
    locating a separator between the positive electrode and a negative electrode including a form of lithium.

2. The method of claim 1, wherein dissolving the uncoated plurality of $Li_2S$ grains comprises:
    dissolving a first portion of the uncoated plurality of $Li_2S$ grains;
    rinsing a second portion of the uncoated plurality of $Li_2S$ grains after dissolving the first portion; and
    dissolving the second portion of the uncoated plurality of $Li_2S$ grains.

3. The method of claim 1, wherein dissolving the uncoated plurality of $Li_2S$ grains comprises:
    dissolving the uncoated plurality of $Li_2S$ grains into a lithium polysulfide.

4. The method of claim 1, further comprising:
    forming a plurality of coating fragments by dissolving the uncoated plurality of $Li_2S$ grains, wherein forming the positive electrode comprises:

forming the positive electrode using the coated plurality of $Li_2S$ grains and the plurality of coating fragments.

5. The method of claim 1, further comprising:
forming a plurality of coating fragments by dissolving the uncoated plurality of $Li_2S$ grains; and
separating the plurality of coating fragments and the coated plurality of $Li_2S$ grains, wherein forming the positive electrode comprises:
forming the positive electrode using the separated coated plurality of $Li_2S$ grains.

6. The method of claim 5, wherein separating the plurality of coating fragments comprises:
separating the plurality of coating fragments using a sedimentation process.

7. The method of claim 5, wherein separating the plurality of coating fragments comprises:
separating the plurality of coating fragments using a centrifugation process.

8. The method of claim 1, wherein forming a plurality of $Li_2S$ grains comprises:
forming a plurality of $Li_2S$ grains with a diameter of between 100 nm and 10 μm.

9. The method of claim 2, wherein forming a plurality of $Li_2S$ grains comprises:
forming a plurality of $Li_2S$ grains with a diameter of between 100 nm and 10 μm.

10. The method of claim 3, wherein forming a plurality of $Li_2S$ grains comprises:
forming a plurality of $Li_2S$ grains with a diameter of between 100 nm and 10 μm.

11. The method of claim 4, wherein forming a plurality of $Li_2S$ grains comprises:
forming a plurality of $Li_2S$ grains with a diameter of between 100 nm and 10 μm.

12. The method of claim 5, wherein forming a plurality of $Li_2S$ grains comprises:
forming a plurality of $Li_2S$ grains with a diameter of between 100 nm and 10 μm.

13. A method of forming an electrochemical cell, comprising:
forming a plurality of $Li_2S$ grains;
coating the plurality of $Li_2S$ grains;
exposing the coated plurality of $Li_2S$ grains and an uncoated plurality of $Li_2S$ grains to toluene;
dissolving the uncoated plurality of $Li_2S$ grains with the toluene; and
rinsing the coated plurality of $Li_2S$ grains after exposing the coated plurality of $Li_2S$ grains to the toluene;
forming the positive electrode using the rinsed coated plurality of $Li_2S$ grains; and
locating a separator between the positive electrode and a negative electrode including a form of lithium.

14. The method of claim 13, further comprising:
forming a plurality of coating fragments by dissolving the uncoated plurality of $Li_2S$ grains, wherein forming the positive electrode comprises:
forming the positive electrode using the coated plurality of $Li_2S$ grains and the plurality of coating fragments.

15. The method of claim 13, further comprising:
forming a plurality of coating fragments by dissolving the uncoated plurality of $Li_2S$ grains; and
separating the plurality of coating fragments and the coated plurality of $Li_2S$ grains, wherein forming the positive electrode comprises:
forming the positive electrode using the separated coated plurality of $Li_2S$ grains.

16. The method of claim 15, wherein separating the plurality of coating fragments comprises:
separating the plurality of coating fragments using a sedimentation process.

17. The method of claim 13, wherein forming a plurality of $Li_2S$ grains comprises:
forming a plurality of $Li_2S$ grains with a diameter of between 100 nm and 10 μm.

18. The method of claim 14, wherein forming a plurality of $Li_2S$ grains comprises:
forming a plurality of $Li_2S$ grains with a diameter of between 100 nm and 10 μm.

19. The method of claim 15, wherein forming a plurality of $Li_2S$ grains comprises:
forming a plurality of $Li_2S$ grains with a diameter of between 100 nm and 10 μm.

20. The method of claim 16, wherein forming a plurality of $Li_2S$ grains comprises:
forming a plurality of $Li_2S$ grains with a diameter of between 100 nm and 10 μm.

* * * * *